United States Patent [19]

Gaeth

[11] Patent Number: 4,826,411

[45] Date of Patent: May 2, 1989

[54] AIR PUMP VANE ASSEMBLY

[75] Inventor: Gerald A. Gaeth, Frankenmuth, Mich.

[73] Assignee: General Motors Corporation, Detroit, Mich.

[21] Appl. No.: 722,593

[22] Filed: Apr. 12, 1985

[51] Int. Cl.[4] ........................ F01C 1/352; F01C 21/00; B21D 39/00; B23P 11/00

[52] U.S. Cl. .................................... 418/152; 418/241; 29/509; 29/515; 403/285

[58] Field of Search ............... 418/137, 138, 152, 241; 29/509, 515, 156.8 B; 403/274, 284, 285

[56] References Cited

U.S. PATENT DOCUMENTS 2,859,511 11/1958 Gallagher ............................ 29/509
3,356,292 12/1967 Brewer ............................... 418/137
3,419,208 12/1968 Brewer ............................... 418/137
3,790,317 2/1974 Hyde .................................. 418/137
3,900,937 8/1975 Schleicher ............................ 29/509
3,967,669 7/1976 Egner .................................. 29/509
4,035,901 7/1977 Lux ...................................... 29/509
4,342,546 8/1982 Rehfeld .

FOREIGN PATENT DOCUMENTS 704034 3/1941 Fed. Rep. of Germany .
3118573 6/1982 Fed. Rep. of Germany .

*Primary Examiner*—John J. Vrablik
*Attorney, Agent, or Firm*—C. K. Veenstra

[57] ABSTRACT

In an air pump vane assembly, the vane hub is both staked to the vane blade and clinched to the vane blade.

2 Claims, 1 Drawing Sheet

PRIOR ART

AIR PUMP VANE ASSEMBLY

TECHNICAL FIELD

This invention relates to a vane assembly for an air pump or the like which is an improvement over the prior art vane assemblies.

SUMMARY OF THE INVENTION

Air pumps are employed on automotive engines to deliver air to the engine exhaust system. The air supports oxidation of hydrocarbons and carbon monoxide in the exhaust system so that the discharge of those constituents to the atmosphere may be maintained within acceptable limits.

This invention provides a vane assembly suitable for such an air pump. The vane assembly provided by this invention includes a hub adapted for mounting the vane assembly on a shaft, and a blade having one or more attaching tabs extending adjacent the hub. The hub is staked into recesses or holes in the blade attaching tab in the manner of a prior art vane assembly, and in addition, the hub is clinched to the blade attaching tab to improve blade retention and to reduce distortion of the hub.

The details as well as other features and advantages of a preferred embodiment of this invention are set forth in the remainder of the specification and are shown in the accompanying drawing.

THE PREFERRED EMBODIMENT

Figure 1:
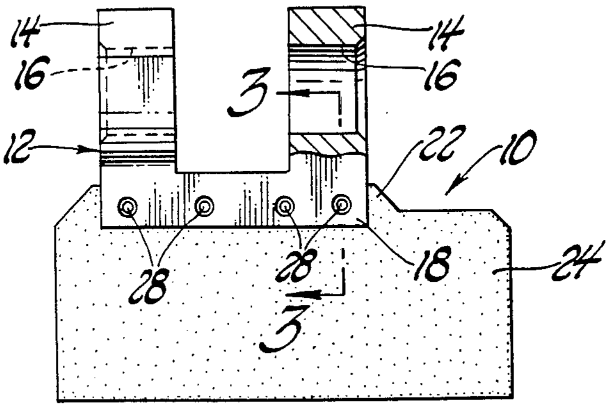
Fig. 1 PRIOR ART
FIG. 1 is an elevational view of a prior art vane assembly showing the locations at which the vane hub is staked to the vane blade attaching tab.
Figure 2:
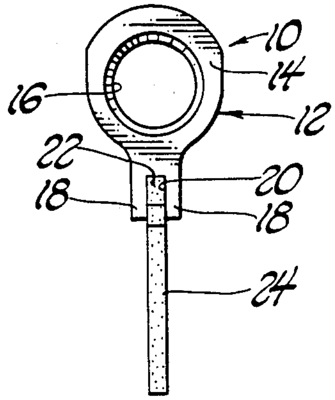
Fig. 2 PRIOR ART
FIG. 2 is an end view of the prior art vane assembly.
Figure 3:
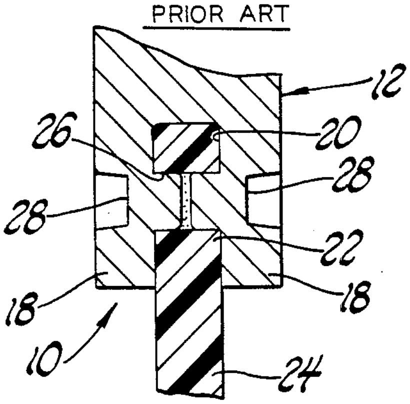
FIG. 3 is an enlarged fragmentary sectional view of the prior art vane assembly showing the staking of the vane hub to the vane blade attaching tab.

Referring first to FIGS. 1-3, the prior art vane assembly 10 has an aluminum hub 12 which includes a pair of legs 14. Each leg 14 is provided with an axial opening 16 adapted to receive a shaft and a bearing suitable for mounting the vane assembly on the shaft.

The lower portion of hub 12 has a pair of webs 18 defining a groove 20 extending axially the length of the hub. Groove 20 receives the attaching tab 22 of a fiberglass laminate blade 24 which projects radially from hub 12. Attaching tab 22 has four transversely extending holes 26 (FIG. 3) aligned axially therealong, and each web 18 is staked into holes 26 as shown at 28.

Figure 4:
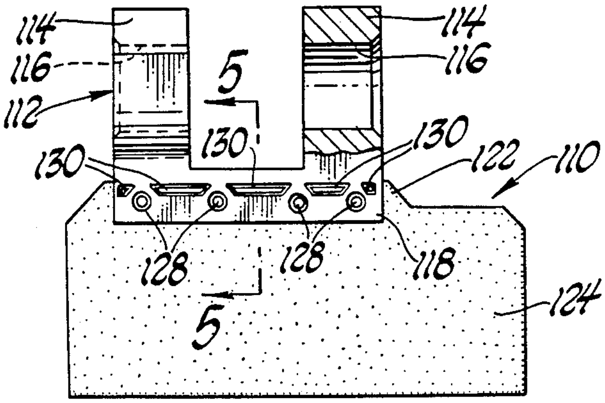
FIG. 4 is an elevational view of a preferred embodiment of the vane assembly provided by this invention, showing the locations at which the vane hub is staked and clinched to the vane blade attaching tab.
Figure 5:
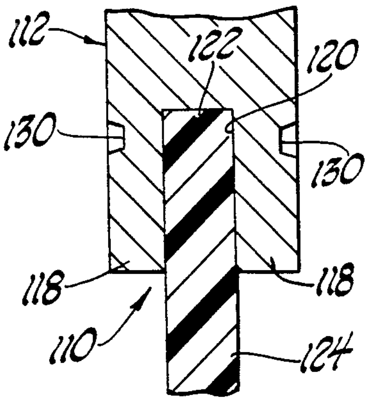
FIG. 5 is an enlarged fragmentary sectional view of the vane assembly provided by this invention, showing the clinching of the vane hub to the vane blade attaching tab.

Referring now to FIGS. 4-5, the vane assembly 110 provided by this invention has an aluminum hub 112 which includes a pair of legs 114. Each leg 114 is provided with an opening 116 adapted to receive a shaft and a bearing suitable for mounting vane assembly 110 on the shaft.

The lower portion of hub 112 has a pair of webs 118 defining a groove 120 extending axially the length of the hub. Groove 120 receives the attaching tab 122 of a fiberglass laminate blade 124 which projects radially from hub 112. Attaching tab 122 has four transversely extending holes aligned axially therealong, and each web 118 is staked into the holes as shown at 128. A sectional view through the right-most stake point 128 of vane assembly 110 would appear identical to FIG. 3, and an end view of vane assembly 110 would appear identical to FIG. 2.

Simultaneously with staking of webs 118 into the attaching tab holes, each web 118 is deformed or clinched as shown at 130 to engage or embrace attaching tab 122. As shown in FIG. 4, the line of clinch regions 130 is parallel to the line of stake points 128 and is interrupted at each stake point 128. Webs 118 accordingly engage attaching tab 122 along substantially its entire length, and the retention of blade 124 to hub 112 is thereby improved over the retention of blade 24 to hub 12.

In addition, by clinching hub 112 to blade 124 simultaneously with staking of hub 112 to blade 124, it has been found that legs 114 are not distorted from their desired position to the same extent as legs 14 are distorted during staking of hub 12 to blade 24.

The embodiments of the invention in which an exclusive property or privilege is claimed are defined as follows:

1. A vane assembly for an air pump or the like, said vane assembly comprising:

a hub having a shaft receiving opening extending axially therethrough and having a pair of webs defining an axially extending groove, and a blade projecting radially from said hub, said blade including an attaching tab received in said groove, said attaching tab having a plurality of transversely extending holes aligned axially therealong, said webs being clinched to said attaching tab and staked into said holes whereby said blade is securely retained by said hub.

2. A vane assembly for an air pump or the like, said vane assembly comprising:

a hub having a shaft receiving opening extending axially therethrough and having a pair of webs defining an axially extending groove, and a blade projecting radially from said hub, said blade including an attaching tab received in said groove, said attaching tab having a plurality of transversely extending holes aligned axially therealong, said webs being staked into said holes and being clinched to said attaching tab at regions extending substantially the entire length of said tab, the line of said clinch regions being parallel to the line of said holes, whereby said blade is securely retained by said hub.

* * * * *